United States Patent [19]

Brayer

[11] Patent Number: 4,702,292

[45] Date of Patent: Oct. 27, 1987

[54] HIGH PERFORMANCE ALL-SEASON TIRE TREAD

[75] Inventor: Randall R. Brayer, Uniontown, Ohio

[73] Assignee: The Goodyear Tire & Rubber Company, Akron, Ohio

[21] Appl. No.: 840,812

[22] Filed: Mar. 18, 1986

[51] Int. Cl.$^4$ ............................................. B60C 11/11
[52] U.S. Cl. .............................. 152/209 R; D12/138
[58] Field of Search ....................... 152/209 R, 209 D; D12/147, 136, 138, 141–145, 146–149, 151

[56] References Cited

U.S. PATENT DOCUMENTS

| | | | |
|---|---|---|---|
| D. 52,731 | 12/1918 | Edwards | D12/138 |
| D. 59,655 | 11/1921 | Hotchkiss | D12/138 |
| D. 63,278 | 11/1923 | Belden | D12/136 |
| D. 72,102 | 3/1927 | Leopold, Jr. | D12/138 |
| D. 75,311 | 5/1928 | Werner | D12/138 |
| D. 88,781 | 12/1932 | Gunsaulus | D12/136 |
| D. 112,993 | 1/1939 | Hardeman | D12/136 |
| D. 169,567 | 5/1953 | Steadman | D12/146 |
| D. 194,202 | 12/1962 | Tiborcz | D12/136 |
| D. 215,396 | 9/1969 | Pond | D12/146 |
| D. 261,496 | 10/1981 | Remy | D12/147 |
| D. 266,919 | 11/1982 | Bennett | D12/146 |
| D. 267,938 | 2/1983 | Grenie | D12/147 |
| D, 270,150 | 8/1983 | Grenie | D12/147 |
| D. 271,756 | 12/1983 | Gorez | D12/147 |
| D. 273,000 | 3/1984 | Takehara | D12/147 |
| D. 275,472 | 9/1984 | Hisatomi et al. | D12/138 |
| D. 283,700 | 5/1986 | Schoonhoven | D12/147 |
| D. 283,703 | 5/1986 | Schoonhoven | D12/147 |
| D. 287,351 | 12/1986 | Cain | D12/147 |
| 3,998,256 | 12/1976 | Verdier | 152/209 R |
| 4,280,543 | 4/1981 | Bond et al. | 152/209 R |
| 4,319,620 | 3/1982 | Knill | 152/209 R |
| 4,383,568 | 5/1983 | Pieper | 152/209 R |
| 4,385,653 | 5/1983 | Okazaki et al. | 152/209 R |
| 4,424,844 | 1/1984 | Fontaine | 152/209 R |
| 4,456,046 | 6/1984 | Miller | 152/209 R |
| 4,478,266 | 10/1984 | Pierson et al. | 152/209 R |
| 4,481,991 | 11/1984 | Pieper | 152/209 R |

FOREIGN PATENT DOCUMENTS

| | | |
|---|---|---|
| 7923582 | 1/1980 | Fed. Rep. of Germany . |
| 8137115 | 7/1982 | Fed. Rep. of Germany . |
| 997922 | 2/1981 | United Kingdom . |
| 1013023 | 11/1982 | United Kingdom . |
| 1014535 | 1/1984 | United Kingdom . |
| 1018020 | 6/1984 | United Kingdom . |
| 1020115 | 11/1984 | United Kingdom . |

OTHER PUBLICATIONS

1986 Tread Design Guide, p. 41, Goodyear Eagle VR 60 and Goodyear Eagle GT.
1986 Tread Design Guide, p. 42, Goodyear Eagle M&S.
Automobil Revue, Sep. 12, 1985, advertisement for Kleber C14-C24-M&S.

Primary Examiner—Michael Ball
Attorney, Agent, or Firm—L. R. Drayer

[57] ABSTRACT

A radial ply pneumatic tire (10) has a tread portion (12) extending circumferentially thereabout. The tread has a plurality of circumferentially extending grooves (36,38,40,42) therein. The axially outermost circumferential grooves (36,42) communicate with one another through two series of crisscrossed curved grooves (44,46), with the grooves of each series inclined in opposite directions across the tread, Drainage grooves (110) extend from the axially outermost circumferential grooves (36,42) to the nearest axial edge (TE$_1$, TE$_2$) of the tread in a substantially axial direction. The tire exhibits good handling at high speeds on both wet and dry pavement, while also providing better snow traction than known high performance tires.

14 Claims, 7 Drawing Figures

HIGH PERFORMANCE ALL-SEASON TIRE TREAD

BACKGROUND OF THE INVENTION

The present invention relates generally to pneumatic tires, and specifically to high performance tires adapted for use in snow as well as on dry and wet pavement.

High performance tires have been characterized by relatively large and stiff traction elements to reduce squirm and provide better handling characteristics. The tires of the present invention have smaller traction elements than comparably sized prior art high performance tires, while still retaining the lateral stiffness of the larger traction elements for good handling. However, the new tires have reduced circumferential stiffness that provides better snow traction than prior art high performance tires.

Tires according to the preferred embodiment of the present invention have been tested for snow traction and showed very good results when compared to commercially available high performance tires. The test results are shown in Tables I and II. In this test a rating of 100 represents the performance of a standard rib-type of tire in snow specially prepared to be as nearly uniform as possible for each test. All of the tires in Table I are of a size P 225/60 R 15.

TABLE I

| Tire | Eagle VR60 (Carved) | Eagle VR60 (Molded) | Eagle GT (Carved) | Tire of Invention | Eagle M & S (Molded) |
|---|---|---|---|---|---|
| Rating | 62/59 (Forward/reverse This is a directional tire) | 78/78 (Forward/reverse This is a directional tire) | 98 (Non-directional) | 112 (Non-directional) | 132 (Non-directional) |

The named tires used in the comparative tests are manufactured by The Goodyear Tire & Rubber Company, and are illustrated on pages 41–42 of the 1986 TREAD DESIGN GUIDE which is published by Tire Guides, Inc. It can be seen that the tire according to the preferred embodiment of the present invention had better snow traction than the commercially available high performance tires tested, with the exception of the Eagle M&S which is a "snow tire" designed specifically for use in mud and snow.

The results of the comparative test shown in Table II are similar to those shown in Table I.

TABLE II

| Tire | P195/60R15 Eagle VR60 (Molded) | P205/60VR15 Eagle GT (Molded) | P215/60R15 Tire of Invention (Carved) | P205/70HR14 Eagle M & S (Molded) |
|---|---|---|---|---|
| Rating | 77/44 (Forward/reverse This is a directional tire) | 101 (Non-directional) | 140 (Non-directional) | 144 (Non-directional) |

Tests for comparing the handling characteristics of a tire according to the preferred embodiment to a Goodyear Eagle GT (which is a commercially successful high performance tire) showed the new tire to have handling characteristics that are substantially equal overall to those of the Goodyear Eagle GT. The tires in this test were of a size P205/60 R 14.

It may be concluded based upon the test results available at the time that a patent application is being filed that a tire according to the present invention provides wet and dry handling characteristics that are substantially equal overall to those of prior art high performance tires, while providing better snow traction than those same tires.

There is provided in accordance with one aspect of the present invention a pneumatic tire comprising: (a) a pair of axially spaced apart annular beads; (b) a radial ply carcass structure extending between said beads with an axially outer portion of the carcass structure folded about each of said beads: (c) a circumferentially extending belt structure disposed radially outwardly of said carcass structure in a crown region of the tire: said belt structure having a pair of axial edges: and (d) a ground engaging tread portion of elastomeric material disposed radially outwardly of said belt structure and extending circumferentially thereabout, said tread portion having a pair of axially spaced apart tread edges, said tread portion having at least four straight grooves therein which extend circumferentially thereabout, two of said circumferentially extending grooves being disposed between each of said tread edges and a mid-circumferential plane of the tire, the axially outermost circumferential groove on each side of the mid-circumferential plane communicating with the axially outermost circumferential groove on the other side of the mid-circumferential plane by means of two series of curved grooves, the grooves of said first series of curved grooves extending between said axially outermost circumferential grooves in a first direction that is inclined with respect to the mid-circumferential plane and the grooves of said second series of curved grooves extending between said axially outermost circumferential grooves in a second direction that is inclined with respect to the mid-circumferential plane opposite to said first direction, each of said curved grooves having a centerline which has a point of inflection of curvature located substantially at the mid-circumferential plane of the tire, each groove of said first series of curved grooves intersecting at least one groove of said second series of curved grooves on each side of the mid-circumferential plane, each of said curved grooves communicating with each of said tread edges by means of drainage grooves extending from said axially outermost circumferential grooves to the nearest tread edge in a substantially axial direction, an axially inner end of each of said drainage grooves being aligned circumferentially with an axially outer end of one of said curved grooves: said circumferential grooves, said first and second series of curved grooves and said drainage grooves cooperating to define a plurality of circumferentially extending series of individual traction elements.

There is provided in accordance with yet another aspect of the invention a pneumatic tire comprising: (a)

a pair of axially spaced apart annular beads: (b) a radial ply carcass structure extending between said beads with an axially outer portion of the carcass structure folded about each of said beads: (c) a circurferentially extending belt structure disposed radially outwardly of said carcass structure in a crown region of the tire, said belt structure having a pair of axial edges; (d) nylon cords extending in a substantially circumferential direction located radially outwardly of at least one layer of said belt structure in the area of its said axial edges for restricting the displacement of the axial edges of said belt structure; and (e) a ground engaging tread portion of elastomeric material disposed radially outwardly of said belt structure and means for restricting and extending circumferentially thereabout, said tread portion having a pair of axially spaced apart tread edges, said tread portion having at least four straight grooves therein which extend circumferentially thereabout, an equal number of said circumferentially extending grooves being disposed between each of said tread edges and a mid-circumferential plane of the tire, the axially outermost circumferential groove on each side of the mid-circumferential plane communicating with the axially outermost circumferential groove on the other side of the mid-circumferential plane by means of two series of curved grooves, the grooves of said first series of curved grooves extending between said axially outermost circumferential grooves in a first direction that is inclined with respect to the mid-circumferential plane and the grooves of said second series of curved grooves extending between said axially outermost circumferential grooves in a second direction that is inclined with respect to the mid-circumferential plane opposite to said first direction, each of said curved grooves having a centerline which comprises a continuous curve which has a point of inflection of curvature located substantially at the mid-circumferential plane of the tire, each groove of said first series of curved grooves intersecting on each side of the mid-circumferential plane a number of grooves of the second series of curved grooves equal to the number of circumferential grooves located on that same side of the mid-circumferential plane, the centerline of each groove of said first series of curved grooves intersecting the centerline of one groove of said second series of curved grooves in the axially outermost circumferential groove on one side of the mid-circumferential plane and intersecting the centerline of another groove of said second series of curved grooves in the axially outermost circumferential groove disposed on the other side of the mid-circumferential plane, each of the axially outer ends of each of said curved grooves being circumferentially aligned with a drainage groove which extends in a substantially axial direction from the respective axially outermost circumferential groove to the nearest tread edge; said circumferential grooves, said first and second series of curved grooves and said drainage grooves cooperating to define a plurality of circumferentially extending series of individual traction elements, the ratio of circumferential length to axial width of said traction elements in a footprint of the tire being greatest for the traction elements that intersect the mid-circumferential plane and progressively less for each subsequent series of traction elements disposed between two of said circumferential grooves as the axial distances of the series from the mid-circumferential plane increases, the traction elements of each circumferentially extending series which is axially interposed between two of said circumferential grooves have a generally triangular shape when viewed looking radially inwardly towards said tread structure, and the traction elements of the circumferentially extending series which are disposed axially outwardly of the axially outermost circumferential groove on each side of the mid-circumferential plane have a generally rectangular shape when viewed looking radially inwardly towards said tread structure.

There is provided in accordance with yet another aspect of the invention a pneumatic tire comprising: (a) a pair of axially spaced apart annular beads; (b) a radial ply carcass structure extending between said beads with an axially outer portion of the carcass structure folded about each of said beads; (c) a circumferentially extending belt structure disposed radially outwardly of said carcass structure in a crown region of the tire; said belt structure having a pair of axial edges: (d) nylon cords extending in a substantially circumferential direction located radially outwardly of at least one layer of said belt structure in the area of its said axial edges for restricting the displacement of the axial edges of said belt structure; and (e) a ground engaging tread portion of elastomeric material disposed radially outwardly of said belt structure and means for restricting and extending circumferentially thereabout, said tread portion having a pair of axially spaced apart tread edges, said tread portion having at least four straight grooves therein which extend circumferentially thereabout, an equal number of said circumferentially extending grooves being disposed between each of said tread edges and a mid-circumferential plane of the tire, the axially outermost circumferential groove on each side of the mid-circumferential plane communicating with the axially outermost circumferential groove on the other side of the mid-circumferential plane by means of two series of curved grooves, the grooves of said first series of curved grooves extending between said axially outermost circumferential grooves in a first direction that is inclined with respect to the mid-circumferential plane in a first direction and the grooves of said second series of curved grooves extending between said axially outermost circumferential grooves in a second direction that is opposite to said first direction, each of said curved grooves having a centerline which comprises a continuous curve which has a point of inflection of curvature located substantially at the mid-circumferential plane of the tire, each groove of said first series of curved grooves intersecting on each side of the mid-circumferential plane a number of grooves of the second series of curved grooves equal to the number of circumferential grooves located on that same side of the mid-circumferential plane, the centerline of each groove of said first series of curved grooves intersecting the centerline of one groove of said second series of curved grooves in the axially outermost circumferential groove on one side of the mid-circumferential plane and intersecting the centerline of another groove of said second series of curved grooves in the axially outermost circumferential groove disposed on the other side of the mid-circumferential plane, each of the axially outer ends of each of said curved grooves being circumferentially aligned with a drainage groove which extends in a substantially axial direction from the respective axially outermost circumferential groove to the nearest tread edge; said circumferential grooves, said first and second series of curved grooves and said drainage grooves cooperating to define a plurality of circumferentially extending series of individual traction elements, the ratio of circumferential length to axial width of said traction elements in a footprint of the tire being greatest for the traction elements that intersect the mid-circumferential plane and progressively less for each subsequent series of traction elements disposed between two of said circumferential grooves as the axial distances of the series from the mid-circumferential plane increases, the traction elements of each circumferentially extending series which is axially interposed between two of said circumferential grooves have a generally triangular shape when viewed looking radially inwardly towards said tread structure, and the traction elements of the circumferentially extending series which are disposed axially outwardly of the axially outermost circumferential groove on each side of the mid-circumferential plane have a generally rectangular shape when viewed looking radially inwardly towards said tread structure.

BRIEF DESCRIPTION OF THE DRAWINGS

The features of the present invention which are believed to be novel are set forth with particularity in the appended claims. The present invention, both as to its structure and manner of operation, may best be understood by reference to the following detailed description, taken in accordance with the accompanying drawings in which:

DETAILED DESCRIPTION OF THE INVENTION

Figure 1:
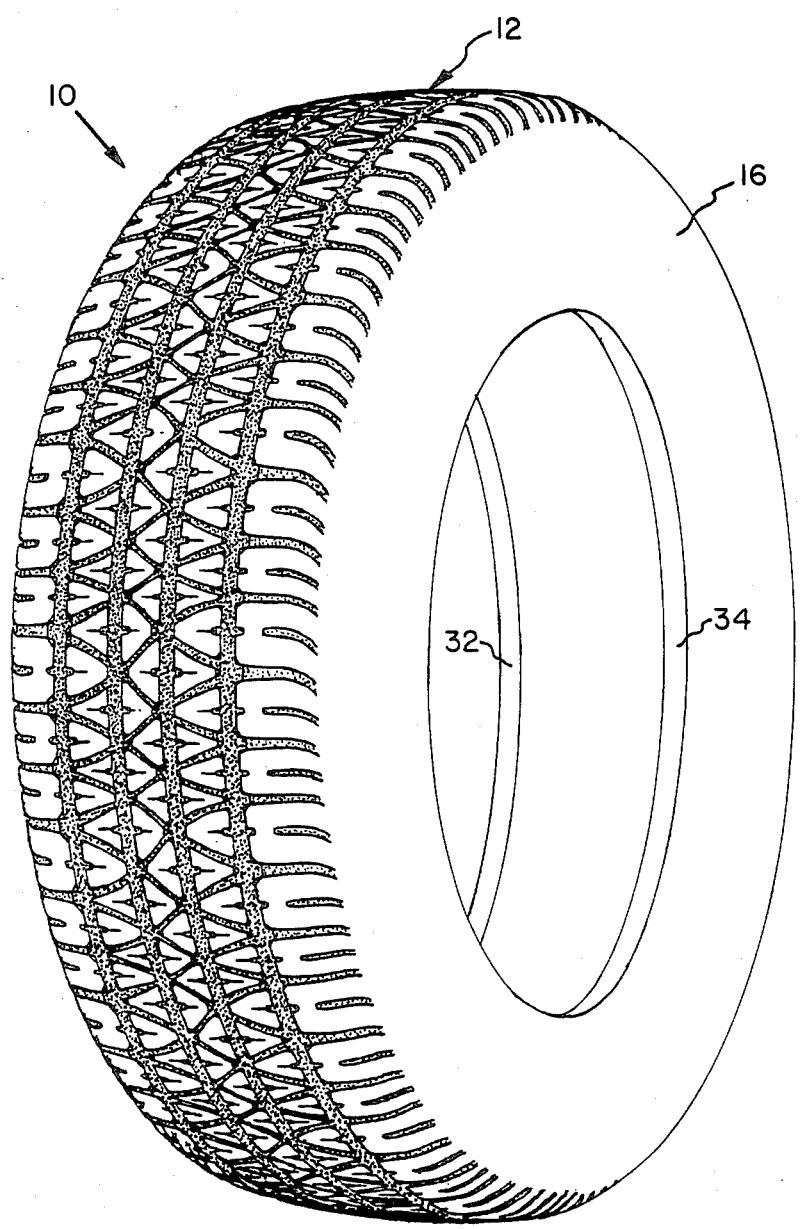
FIG. 1 is a perspective view of a tire according to the preferred embodiment of the invention.
Figure 2:
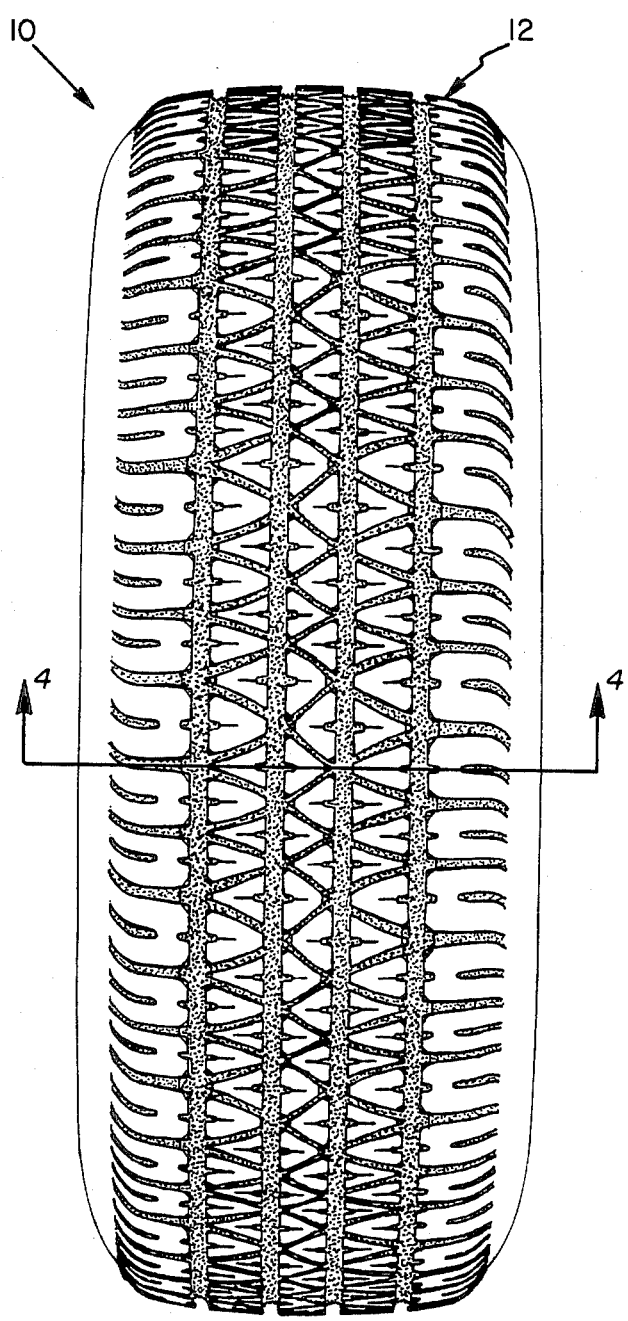
FIG. 2 is a front elevation view of the tire shown in FIG. 1.

Referring to FIGS. 1-4 there is shown a pneumatic tire 10 in accordance with the preferred embodiment of the present invention. The tire 10 illustrated has what is commonly referred to in the tire art as a radial ply carcass structure. For the purposes of the present invention a tire has a radial ply carcass structure when the cords of the carcass reinforcing ply or plies are oriented at an angle in the range of 75° to 90° with respect to the mid-circumferential plane of the tire.

As used herein, "radial" and "radially" refer to directions perpendicular to the axis of rotation of a tire, and "axial" and "axially" refer to directions parallel to the axis of rotation of a tire. A tire according to the present invention has a mid-circumferential plane CP which is a plane perpendicular to the axis of rotation of the tire, located midway between the axial edges $TE_1$, $TE_2$ of the tread 12 in a "footprint of the tire". As used herein a "footprint of a tire" refers to a footprint of a static tire when it has been mounted on its designated rim, then inflated to its design inflation pressure and subjected to its rated load. The tread width TW is the axial distance between the axial edges of the tread in a footprint of a tire. As used herein "axially inwardly" is understood to mean an axial direction going from an axial edge of the tread towards the mid-circumferential plane, and "axially outwardly" is understood to mean an axial direction going from the mid-circumferential plane towards an axial edge of the tread.

A tire according to the invention has a pair of axially spaced apart annular beads 18,20 which are substantially inextensible. Each of the beads 18,20 is located in a bead portion 32,34 having exterior surfaces which are shaped to mate with the bead seat and retaining flanges of a rim (not shown) upon which the tire is intended to be mounted. A radial ply carcass structure, in the preferred embodiment comprising a pair of plies 22,24 having side by side reinforcing cords of polyester material, extends between the beads 18,20 with an axially outer portion of the carcass structure folded about each of the beads in the customary manner. While in the preferred embodiment the carcass ply structure comprises two plies of reinforcing material, it is understood that any number of carcass plies of any material known to be used for such carcass plies, could be employed without deviating from the scope of the present invention.

Preferably, a tire according to the present invention is a tubeless tire having a layer 13 of low permeability material disposed inwardly of the carcass ply structure, and elastomeric sidewalls 14,16 disposed axially outwardly of the carcass ply structure. A circumferentially extending belt structure comprising a pair of belts 26,28 having steel reinforcing cords oriented at angles in the range of 15° to 30° with respect to the mid-circumferential plane of the tire is disposed radially outwardly of the carcass structure in a crown region of the tire. While in the preferred embodiment the belt structure comprises two unfolded plies of steel cords, it is understood that any desired combination of folded and unfolded belt plies, of any material known to be used for belt plies, may be employed without deviating from the scope of the invention.

A tire according to the invention is a high performance tire, that is to say a tire designed to be operated at speeds higher than those at which ordinary passenger car tires are operated. One of the problems that radial tires have been known to exhibit when operated at high speeds is belt edge separation, in which the axial edges of the belt structure are physically pulled away from the carcass ply structure. In order to reduce, and hopefully prevent, this phenomena it is known in the art to employ a means 30 for restricting the displacement of the axial edges of the belt structure in a radially outward direction. In the preferred embodiment shown in FIG. 4 this means for restricting comprises two layers 30 of nylon cords extending in a substantially circumferential direction and located radially outwardly of at least one layer of the belt structure at least in the area of the axial edges of the belt structure. Any number of means for restricting the edges of the belt structure are known in the art, and it is believed that any of these means for restricting could be used in a tire according to the present invention without deviating from the scope of this invention. However, it is not believed to be essential to the invention to have a means for restricting the belt edges since not all belt structures exhibit this separation problem, and not all high performance tires are rated to operate at speeds where they have this problem.

A ground-engaging tread portion 12 of an elastomeric substance is disposed radially outwardly of the belt structure 26,28 and means for restricting (30) and extends circumferentially thereabout.

Figure 6:
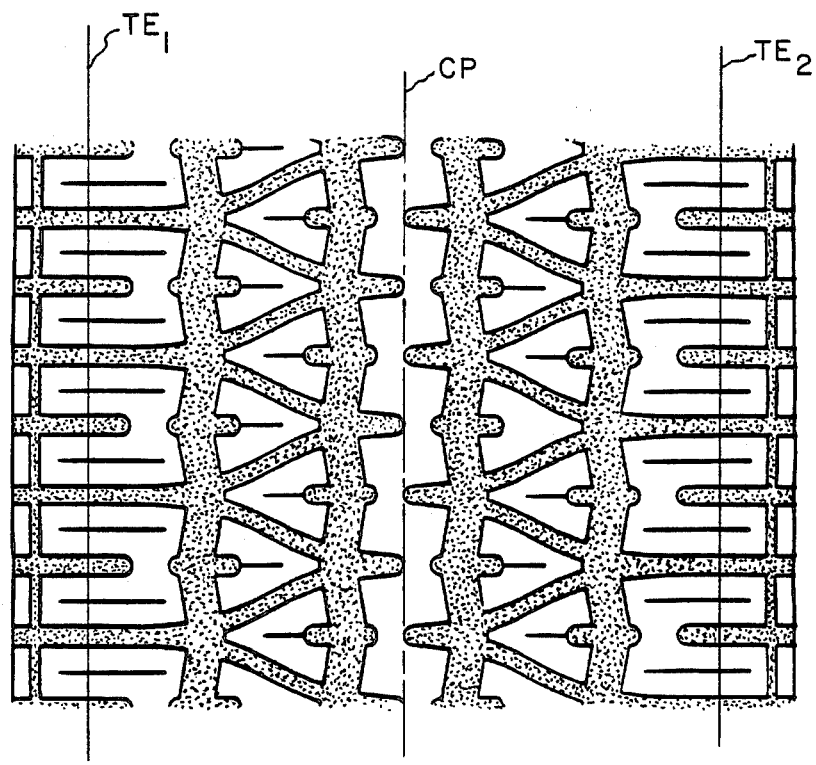
FIG. 6 is a plan view of a portion of the tread of a tire according to another alternate embodiment of the invention.
Figure 7:
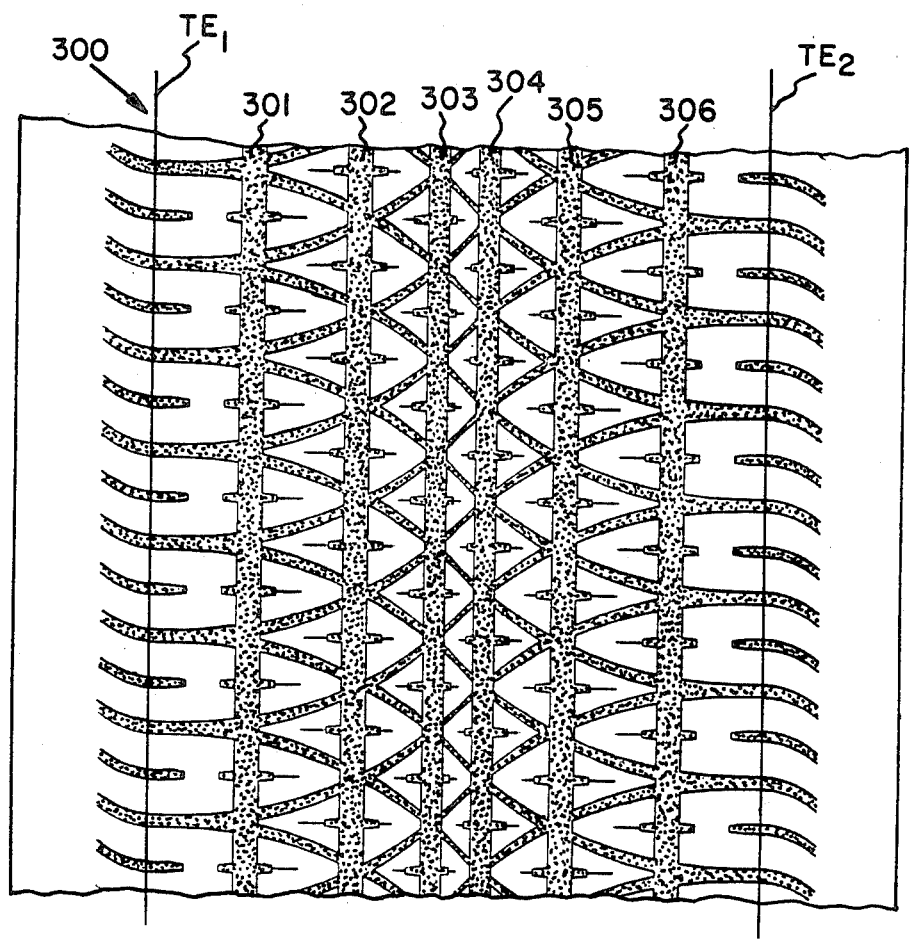
FIG. 7 is a plan view of a portion of the tread of a tire according to another preferred embodiment of the invention.

The tread portion has at least four grooves, preferably an even number of grooves, 36,38,40,42 therein which extend circumferentially about the tread. The exact number of "circumferential grooves" in the tread may be varied depending upon the size of the tire. For example, as illustrated in FIG. 7, the tread portion 300 of a tire according to the preferred embodiment may have six circumferential grooves 301,302,303,304,305,306 therein, while having all of the other features set forth with respect to the embodiment shown in FIGS. 1-4. As used herein a "circumferential groove" or "circumferentially extending groove" is a groove that extends circumferentially around the tread portion of a tire. Two of the circumferentially extending grooves, (preferably an equal number of circumferential grooves) are disposed between each of the tread edges $TE_1$, $TE_2$ and the mid-circumferential plane CP of the tire. The width of the circumferential grooves is large enough that these grooves will remain open in a footprint of the tire. While it is preferred that the circumferential grooves should be straight grooves, as shown in FIGS. 1-5, the circumferential grooves could follow a slightly zigzagged or otherwise nonlinear path as shown for example in FIG. 6 without deviating from the scope of the present invention. The circumferential grooves, serve to channel water in directions perpendicular to the tire's axis of rotation.

In the preferred embodiment of the invention, as illustrated in FIGS. 1-4, the axially outermost circumferential groove 36,42 on each side of the mid-circumferential plane CP communicates with the axially outermost circumferential groove 36,42 on the other side of the mid-circumferential plane by means of two series of curved grooves. However, as will be later disclosed with reference to FIG. 5, the curved grooves alternatively may not extend uninterruptedly across the tread as they do in the preferred embodiment. The curved grooves have widths along their entire lengths which are large enough that they remain open in a footprint of the tire. Preferably the width of a curved groove increases as the distance from the mid-circumferential plane increases.

Figure 3:
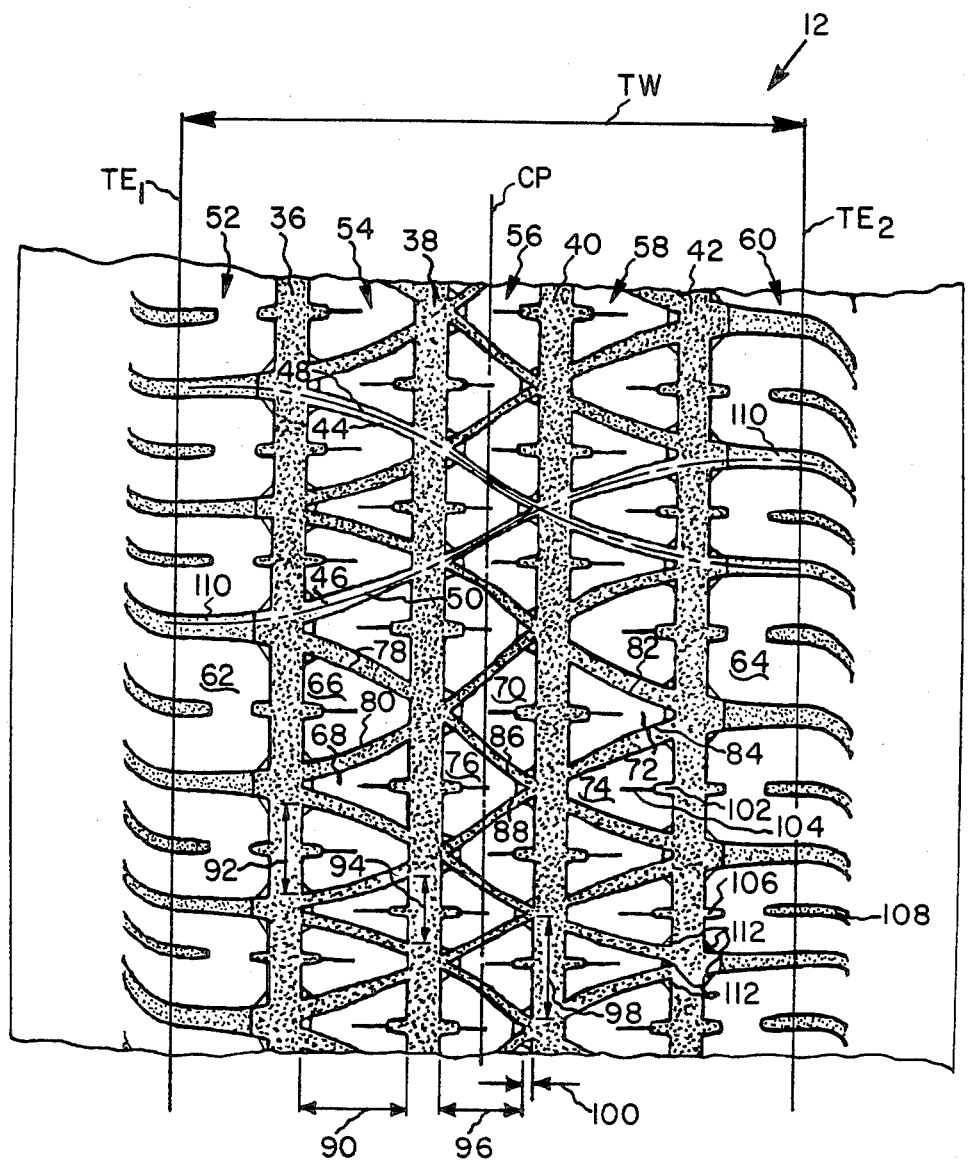
FIG. 3 is an enlarged front elevation view of a portion of the tread of the tire shown in FIG. 1.

In the preferred embodiment, as shown best in FIG. 3, the grooves 44 of the first series of curved grooves extend between the axially outermost circumferential grooves 36,42 on the opposite sides of the mid-circumferential plane in a first direction that is generally inclined with respect to the mid-circumferential plane. Put another way, for each of the curved grooves a straight line extending between its ends would extend diagonally across the tread. Each of the grooves 46 of the second series of curved grooves extends between these same axially outermost circumferential grooves 36,42 in a direction that is inclined with respect to the mid-circumferential plane opposite to the first direction in which the grooves of the first series of curved grooves are inclined. Therefore, the tread has a pattern of crisscrossed curved grooves 44,46 extending circumferentially thereabout and disposed between a pair of axially spaced apart circumferential grooves 36,42.

Each of the diagonally extending curved grooves 44,46 of each said set of curved grooves has a centerline 48,50 which has a point of inflection of curvature located substantially at, preferably exactly at, the mid-circumferential plane CP of the tire. As used herein a point of inflection is located substantially at the mid-circumferential plane if it is located within an axial distance of 5% of the tread width TW on either side of the mid-circumferential plane. The inflection of the curved grooves is important because it allows the tire to be a "non-directional" tire, which means it functions the same regardless of the direction in which it is rotated. While it is preferred, as shown in the figures of the drawing, that the centerlines of the curved grooves comprise a continuous curve having a single point of inflection, it is understood that the paths of the curved grooves could have a number of points of inflection (that is to say following an undulating path) and still remain within the scope of this invention. Preferably all of the grooves of the first series of curved grooves are substantially identical, and all of the grooves of the second series of curved grooves are substantially identical.

Each groove 44 of the first series of curved grooves intersects at least one groove 46 of the second series of curved grooves on each side of the mid-circumferential plane CP. Preferably, each groove of the first series of curved grooves intersects on each side of the mid-circumferential plane a number of different grooves of the second series of curved grooves which is equal to the number of circumferential grooves located on that same side of the mid-circumferential plane. Most preferably each of the points at which the centerlines of the curved grooves intersect are located within an axially measured distance of no more than about 5 mm from one of the circumferential grooves, and preferably are located within one of the circumferential grooves. In the preferred embodiment each groove 44 of the first series of curved grooves has a centerline 48 that intersects a centerline 50 of one of the grooves 46 of the second series of curved grooves in the axially outermost circumferential groove 36,42 disposed on one side of the mid-circumferential plane CP and intersects a centerline of another groove of said second series of curved grooves in the axially outermost circumferential groove 36,42 disposed on the other side of the mid-circumferential plane. Put another way, in the preferred embodiment every groove of each of the two series of curved grooves intersects one groove of the other series in the axially outermost circumferential groove on one side of the mid-circumferential plane and a different groove of the other series in the axially outermost circumferential groove on the other side of the mid-circumferential plane.

Figure 4:
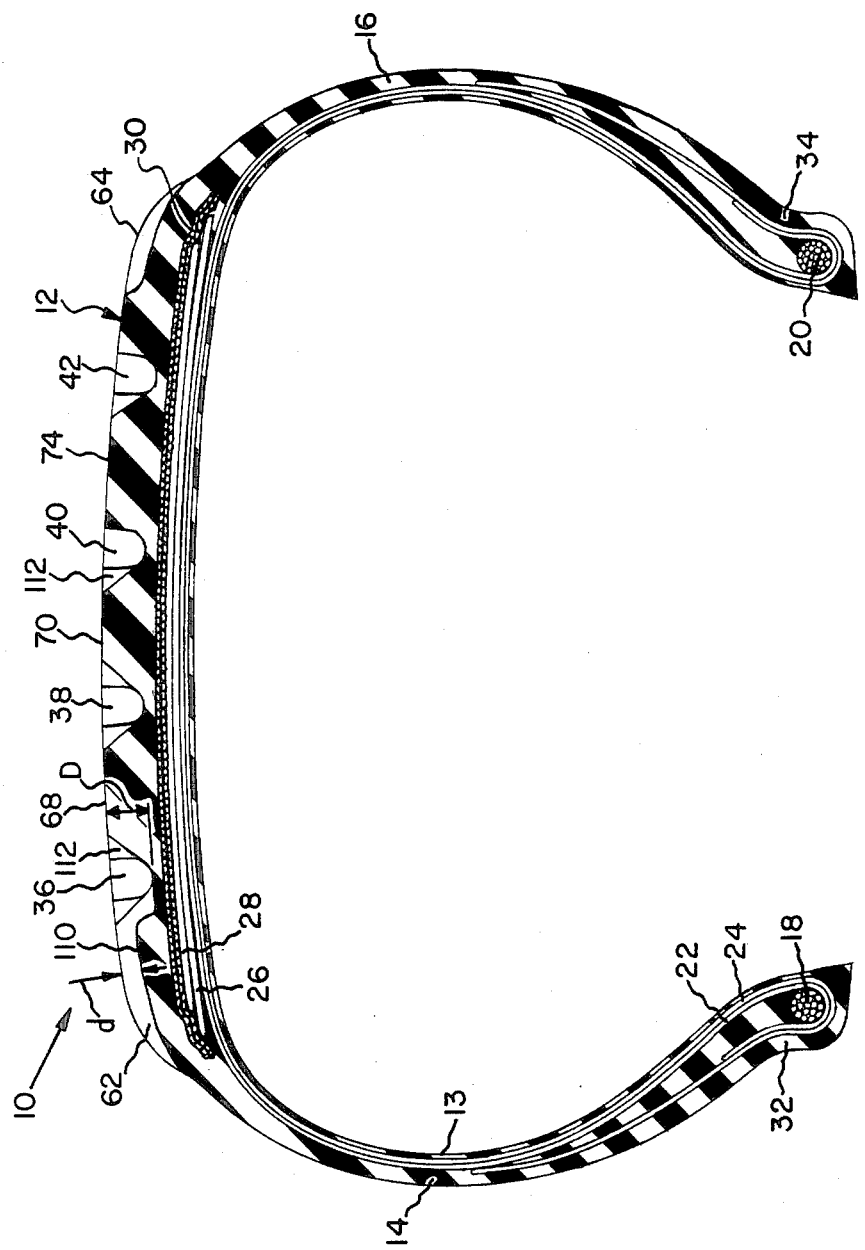
FIG. 4 is a radial cross-sectional view of the tire of FIG. 1, taken along line 4—4 of FIG. 2.

Each of the curved grooves 44,46 communicates with each of the axial edges $TE_1$, $TE_2$ of the tread by means of drainage grooves 110 extending from each of the axially outermost circumferential grooves 36,42 to the nearest tread edge. An axially inner end of each of the drainage grooves 110 is aligned circuaferentially with an axially outer end of one of the curved grooves. In the preferred embodiment the drainage grooves 110 extend in a substantially axial direction, preferably in an axial direction, from an axially outermost circumferential groove to the nearest tread edge. As used herein with respect to the drainage grooves a "substantially axial" direction is a direction that varies from an axial direction by not more than 10 degrees. This orientation is important because it allows high stiffness of the traction elements in the shoulders of the tire which improves handling which is critical in a high performance tire. As best seen in FIG. 4 the depth d of the drainage grooves 110 may be, but is not necessarily, less than the depth D of the axially outermost circumferential groove 36 that the drainage groove communicates with. This variation in groove depth stiffens the traction elements in the shoulders of the tire and improves handling. The necessity of such a feature varies between tire sizes and vehicle characteristics, and is best applied on a case by case basis by a tire designer using sound engineering judgment. The drainage grooves 110 each have a width which is large enough that they will remain open in a footprint of the tire. In the preferred embodiment the drainage grooves on each side of the mid-circumferential plane that are aligned with any particular curved groove are circumferentially offset from one another.

Put another way, in the preferred embodiment each drainage groove 110 extends axially inwardly from an axial edge $TE_1$, $TE_2$ of the tread to an axially outermost circumferential groove 36,42, where the drainage groove is circumferentially aligned with the axially outer ends of a groove 44,46 of each of the first and second sets of curved grooves. Each groove of the first and second series of curved grooves extends generally diagonally across the tread to the axially outermost circumferential groove on the other side of the mid-circumferential plane, where it intersects a groove of the other series of curved grooves, and this intersection is circumferentially aligned with another drainage groove that extends axially outwardly to the nearest tread edge. The drainage grooves on each side of the mid-circumferential plane that are aligned with any particular curved groove are circumferentially offset from one another.

The circumferential grooves 36,38,40,42, the first and second series of curved grooves 44,46 and the drainage grooves 110 cooperate to define a plurality of circumferential series, or rows, 52,54,56,58,60 of individual traction elements 62,64,66,68,70,72,74,76. The traction elements 66,68,70,72,74,76 of each circumferentially extending series, or row, 54,56,58 which is axially interposed between two of said circumferential grooves 36,38,40,42 have a generally triangular shape when viewed looking radially inwardly towards the tread structure. Of course, since the grooves extending diagonally across the tread are curved, the circumferential edges 78,80 of every other traction element 66,74 in a series of traction elements axially disposed between two of the circumferential grooves, but not intersecting the mid-circumferential plane, are convex as viewed in a circumferential direction, while the circumferential edges 82,84 of the circumferentially adjacent traction elements 68,72 are concave as viewed in a circumferential direction. The circumferential edges 86,88 of the traction elements 70,76 that are axially aligned with the points of inflection of the curved grooves 44,46 are partially convex and partially concave when viewed in a circumferential direction.

The traction elements 62,64 located axially outwardly of the axially outermost circumferential grooves 36,42 are substantially rectangular, preferably rectangular, as viewed looking radially inwardly towards the tread of the tire. As already discussed this feature provides stiffer traction elements at the tread shoulders to obtain better handling.

It is an important feature of the preferred embodiment of the new tire that in a footprint of the tire the ratio of circumferential length to axial width of the traction elements which are disposed between pairs of circumferential grooves is greatest for the traction elements that intersect the mid-circumferential plane, and is progressively less for each subsequent series of traction elements as the axial distance of the series from the mid-circumferential plane increases. This feature is also applicable to the alternate embodiments of FIGS. 5 and 6 (which have center ribs) when the tread has six or more circumferential grooves, at least with regard to the series of traction elements disposed between circumferential grooves. That is to say, with reference to FIG. 3, that for the traction elements 70,76 of the series 56 which intersects the mid-circumferential plane CP the ratio of circumferential length 98 to axial width 96 is greater than the ratio of circumferential lengths 92,94 to axial width 90 of the traction elements 66,68,72,74 of the two axially next adjacent series 54,58. This feature of the tread allows greater overlapping of traction elements in the centermost series 56 as they enter the footprint for better handling, a region of intermediate stiffness on each side of the mid-circumferential centerplane, and then a region of high stiffness in the shoulder elements 62,64. It is believed that this feature contributes to the good handling exhibited by the new tires during handling tests.

In order to provide the tread with additional biting edges, at least one traction element, preferably every traction element, has a notch 102 therein located at an edge of the traction element which is bordered by one of the circumferentially extending grooves 36,38,40,42. Preferably, this same traction element, and most preferably every traction element disposed between two circumferential grooves, has a narrow groove 104 therein which communicates with the notch 102. The narrow grooves 104 each have a width so small that they are closed in a footprint of the tire. Preferably these narrow grooves each extend in an axial direction.

The traction elements 62,64 of the two axially outermost series 52,60 of traction elements (shoulder elements) may have notches 108 therein in the shoulder region of the tire.

Most preferably the traction elements 70,76 that intersect the mid-circumferential plane CP have an axial width 96 that is slightly less than the axial distance between the axially innermost circumferential grooves 38,40 on each side of the mid-circumferential plane by a distance 100 selected in accordance with good engineering practice in order to facilitate better water evacuation from the centermost portion of the tread.

In order to reduce irregular wear at the sharp points or corners of the traction elements they are beveled, as pointed out at reference character 112.

Figure 5:
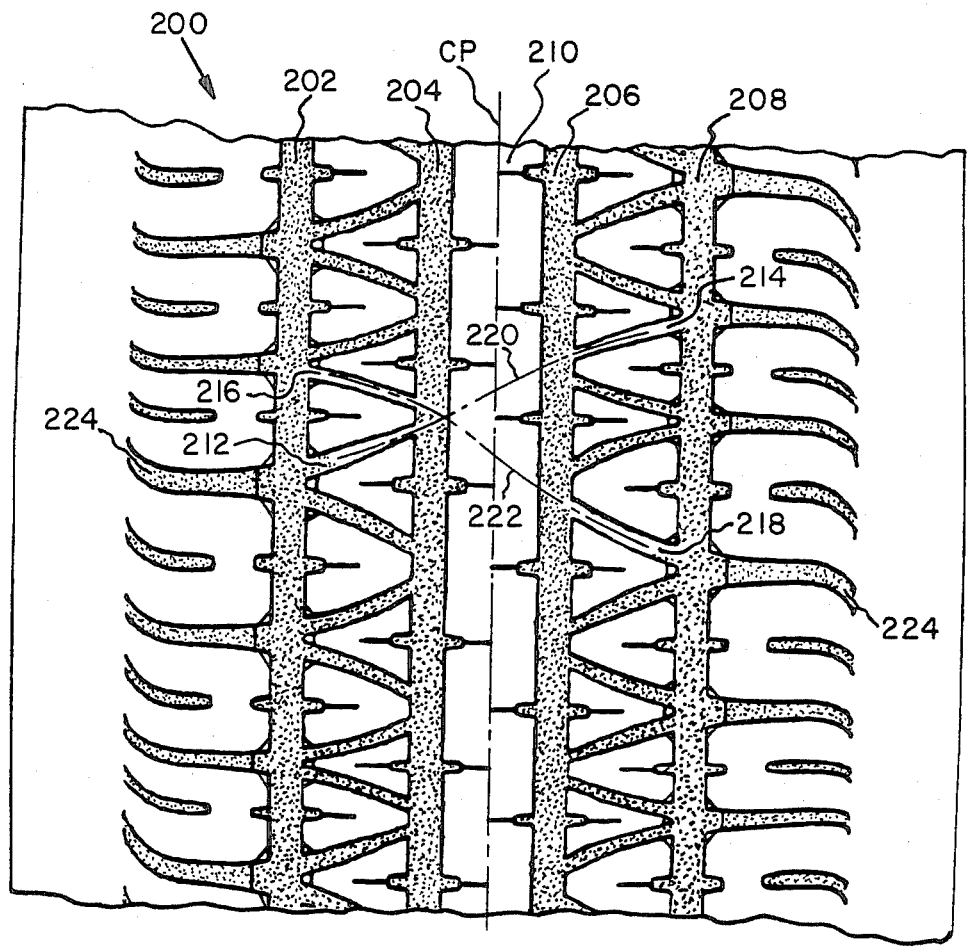
FIG. 5 is front elevation view of a portion of the tread of a tire according to an alternate embodiment of the invention.

While the preferred embodiment illustrated in FIGS. 1-4 has a row of independent traction elements disposed between the axially innermost circumferential grooves, in an alternate embodiment there is a continuous rib disposed between the axially innermost circumferential grooves. This alternate embodiment could be employed if a tire designer is particularly concerned about the level of noise generated by a tire during use, since it is generally recognized that center rib tires operate quieter than similar non-center rib tires. However, it is believed that the snow traction of this embodiment will not be as good as that of the preferred embodiment. A tire having a tread according to such an alternate embodiment is illustrated in FIG. 5, and will be described with reference thereto.

A tire according to the alternate embodiment has annular beads, a radial ply carcass structure, a belt structure, and preferably a means for restricting the belt structure that are substantially the same as those already described with respect to the preferred embodiment.

The ground-engaging tread portion of a tire according to the alternate embodiment has axially spaced apart tread edges, a tread width, circumferentially extending grooves, and drainage grooves substantially the same as those already described with respect to the preferred embodiment.

The tread portion 200 has at least four, (but in any case an even number depending upon tire size), circumferentially extending grooves 202,204,206,208 therein. Two of these circumferential grooves, (but in any case preferably an equal number of circumferential grooves), being disposed between each of the tread edges and the mid-circumferential plane CP of the tire. The axially innermost circumferential grooves 204,206 on each side of the mid-circumferential plane cooperate to define a rib 210 which extends circumferentially about the tire in a continuous manner, that is without being interrupted by any grooves that extend across its axial width. The presence of the rib 210 of course makes it impossible to have curved grooves extending between the axially outermost circumferential grooves 202,208.

In this alternate embodiment the axially outermost circumferential groove 202,208 on each side of the mid-circumferential plane communicates with the axially innermost circumferential groove 204,206 on the same side of the mid-circumferential plane by means of two series of curved grooves. The grooves 212,214 of the first series of curved grooves extend between the axially outermost and innermost circumferential grooves on each side of the mid-circumferential plane in a first direction that is inclined with respect to the mid-circumferential plane. The grooves 216,218 of the second series of curved grooves extend between the axially outermost and innermost circumferential grooves on each side of the mid-circumferential plane in a second direction that is inclined with respect to the mid-circumferential plane opposite to said first direction. Preferably, each of the curved grooves has a centerline 220,222 which when projected towards the mid-circumferential plane is tangent to the projected centerline of a curved groove which is located on the other side of the mid-circumferential plane. This point of tangency is located an axial distance of not greater than 5% of the tread width from the mid-circumferential plane. However, as illustrated in FIG. 6 the portions of the tread on each side of the mid-circumferential plane CP may be shifted circumferentially with respect to one another so that the centerlines of the curved grooves are not tangent to one another when projected toward the mid-circumferential plane without deviating from the scope of the invention.

Each groove 212,214 of the first series of curved grooves on each side of the mid-circumferential plane intersects at least one groove 216,218 of the second series of curved grooves located on the same side of the mid-circumferential plane. Each of the curved grooves, on both sides of the mid-circumferential plane, communicates with the nearest tread edge by means of a drainage groove 224 extending substantially axially, preferably axially, from the axially outermost circumferential groove 202,208 to the nearest tread edge.

The circumferential grooves, curved grooves and drainage grooves all cooperate to define individual traction elements in substantially the same manner described herein with respect to the preferred embodiment, with the exception of the continuous center rib 210.

Put another way, the alternate embodiment is substantially the same as the preferred embodiment with the exception that the circumferential series of traction elements that intersect the mid-circumferential plane in the preferred embodiment is replaced by a continuous rib. All other features of the preferred embodiment are applicable to the alternate embodiment.

It will be apparent to those skilled in the tire art that other features of the tire could be modified while remaining within the scope of the present invention.

I claim:

1. A pneumatic tire comprising:
  (a) a pair of axially spaced apart annular beads;
  (b) a radial ply carcass structure extending between said beads with an axially outer portion of the carcass structure folded about each of said beads;
  (c) a circumferentially extending belt structure disposed radially outwardly of said carcass structure in a crown region of the tire; said belt structure having a pair of axial edges; and
  (d) a ground engaging tread portion of elastomeric material disposed radially outwardly of said belt structure and extending circumferentially thereabout, said tread portion having a pair of axially spaced apart tread edges, said tread portion having at least four straight grooves therein which extend circumferentially thereabout, two of said circumferentially extending grooves being disposed between each of said tread edges and a mid-circumferential plane of the tire, the axially outermost circumferential groove on each side of the mid-circumferential plane communicating with the axially outermost circumferentially extending groove on the other side of the mid-circumferential plane by means of two series of curved grooves, the grooves of said first series of curved grooves extending between said axially outermost circumferentially extending grooves in a first direction that is inclined with respect to the mid-circumferential plane and the grooves of said second series of curved grooves extending between said axially outermost circumferentially extending grooves in a second direction that is inclined with respect to the mid-circumferential plane opposite to said first direction, each of said curved grooves having a centerline which has a point of inflection of curvature located substantially at the mid-circumferential plane of the tire, each groove of said first series of curved grooves intersecting at least two grooves of said second series of curved grooves on each side of the mid-circumferential plane, each of said curved grooves communicating with each of said tread edges by means of drainage grooves extending from said axially outermost circumferentially extending grooves to the nearest tread edge in a substantially axial direction, an axially inner end of each of said drainage grooves each being aligned circumferentially with an axially outer end of one of said curved grooves; said circumferentially extending grooves, said first and second series of curved grooves and said drainage grooves cooperating to define a plurality of circumferentially extending series of individual traction elements, the ratio of circumferential length to axial width of said traction elements in a footprint of the tire being greatest for the traction elements that intersect the mid-circumferential plane and progressively less for each subsequent series of traction elements disposed between two of said circumferentially extending grooves as the axial distances of the series from the mid-circumferential plane increases.

2. A pneumatic tire according to claim 1 wherein the traction elements of each circumferentially extending series which is axially interposed between two of said circumferential grooves have a generally triangular shape when viewed looking radially inwardly towards said tread structure.

3. A pneumatic tire according to claim 1 wherein each groove of said first series of curved grooves intersects on each side of the mid-circumferential plane a number of grooves of the second series of curved grooves equal to the number of circumferential grooves located on that same side of the mid-circumferential plane.

4. A pneumatic tire according to claim 1 further comprising a means for restricting the displacement of the axial edges of said belt structure.

5. A pneumatic tire according to claim 2 further comprising a means for restricting the displacement of the axial edges of said belt structure.

6. A pneumatic tire according to claim 3 further comprising a means for restricting the displacement of the axial edges of said belt structure.

7. A pneumatic tire according to claim 1 wherein said circumferential grooves are straight grooves.

8. A pneumatic tire according to any one of claims 1, 2 to 7 wherein said circumferentially extending grooves are straight grooves.

9. A pneumatic tire according to claim 3 wherein each groove of said first series of curved grooves has a centerline that intersects a centerline of one groove of said second series of curved grooves in the axially outermost circumferentially extending groove disposed on one side of the mid-circumferential plane and intersects a centerline of another groove of said second series of curved grooves in the axially outermost circumferentially extending grooves disposed on the other side of the mid-circumferential plane.

10. A pneumatic tire comprising:
(a) a pair of axially spaced apart annular beads;
(b) a radial ply carcass structure extending between said beads with an axially outer portion of the carcass structure folded about each of said beads;
(c) a circumferentially extending belt structure disposed radially outwardly of said carcass structure in a crown region of the tire; said belt structure having a pair of axial edges;
(d) a means for restricting comprising nylon cords extending in a substantially circumferential direction located radially outwardly of at least one layer of said belt structure in the area of its said axial edges for restricting the displacement of the axial edges of said belt structure; and
(e) a ground engaging tread portion of elastomeric material disposed radially outwardly of said belt structure and means for restricting and extending circumferentially thereabout, said tread portion having a pair of axially spaced apart tread edges, said tread portion having at least four straight grooves therein which extend circumferentially thereabout, an equal number of said circumferentially extending grooves being disposed between each of said tread edges and a mid-circumferential plane of the tire, the axially outermost circumferentially extending groove on each side of the mid-circumferential plane communicating with the axially outermost circumferentially extending groove on the other side of the mid-circumferential plane by means of two series of curved grooves, the grooves of said first series of curved grooves extending between said axially outermost circumferentially extending grooves in a first direction that is inclined with respect to the mid-circumferential grooves in a first direction and the grooves of said second series of curved grooves extending between said axially outermost circumferentially extending grooves in a second direction that is opposite to said first direction, each of said curved grooves having a centerline which comprises a continuous curve which has a point of inflection of curvature located substantially at the mid-circumferential plane of the tire, each groove of said first series of curved grooves intersecting on each side of the mid-circumferential plane a number of grooves of the second series of curved grooves equal to the number of circumferential grooves located on that same side of the mid-circumferential plane, the centerline of each groove of said first series of curved grooves intersecting the centerline of one groove of said second series of curved grooves in the axially outermost circumferentially extending groove on one side of the mid-circumferential plane and intersecting the centerline of another groove of said second series of curved grooves in the axially outermost circumferentially extending groove disposed on the other side of the mid-circumferential plane, each of the axially outer ends of each of said curved grooves being circumferentially aligned with a drainage groove which extends in a substantially axial direction from the respective axially outermost circumferentially extending groove to the nearest tread edge; said circumferentially extending grooves, said first and second series of curved grooves and said drainage grooves cooperating to define a plurality of circumferentially extending series of individual traction elements, the ratio of circumferential length to axial width of said traction elements in a footprint of the tire being greatest for the traction elements that intersect the mid-circumferential plane and progressively less for each subsequent series of traction elements disposed between two of said circumferentially extending grooves as the axial distances of the series from the mid-circumferential plane increases, the traction elements of each circumferentially extending series which is axially interposed between two of said circumferentially extending grooves have a generally triangular shape when viewed looking radially inwardly towards said tread structure, and the traction elements of the circumferentially extending series which are disposed axially outwardly of the axially outermost circumferentially extending groove on each side of the mid-circumferential plane have a generally rectangular shape when viewed looking radially inwardly towards said tread structure.

11. A pneumatic tire according to claim 10 wherein each of said traction elements has a notch therein located at an edge of the element which is bordered by one of said circumferentially extending grooves.

12. A pneumatic tire according to claim 11 wherein each traction element also has a narrow groove therein which communicates with said notch, said narrow groove having a width such that the narrow groove is closed in a footprint of the tire and extending in an axial direction.

13. A pneumatic tire according to any one of claims 10, 11 or 12 wherein said drainage grooves extend in an axial direction.

14. A pneumatic tire according to any one of claims 10, 11 or 12 wherein the point of inflection of each of said curved grooves is located at the mid-circumferential plane of the tire.

* * * * *